US006189530B1

(12) United States Patent
Shingler

(10) Patent No.: US 6,189,530 B1
(45) Date of Patent: Feb. 20, 2001

(54) PORTABLE OUTDOOR COOKER WITH CONVEX COOKING SURFACE

(76) Inventor: Robert A. Shingler, 7997 SW. 189th Ave., Beaverton, OR (US) 97007

(*) Notice: Under 35 U.S.C. 154(b), the term of this patent shall be extended for 0 days.

(21) Appl. No.: 09/519,679

(22) Filed: Mar. 6, 2000

(51) Int. Cl.[7] .................................................. A47J 37/00
(52) U.S. Cl. ........................... 126/41 R; 126/40; 126/50; 126/51; 99/425; 99/445; 99/446; 99/447
(58) Field of Search .............................. 126/41 R, 25 R, 126/40, 50, 51, 39 R, 9 R, 9 A, 38, 276; 99/425, 400, 445, 446, 444, 447; 219/386, 439, 520, 521

(56) References Cited

U.S. PATENT DOCUMENTS

| 3,824,984 | 7/1974 | Swanson et al. |
|---|---|---|
| 4,062,341 | 12/1977 | Panzarella . |
| 4,108,142 | * 8/1978 | Barson et al. ..................... 126/41 R |
| 4,313,416 | 2/1982 | Lau . |
| 4,342,259 | * 8/1982 | Lee ........................................ 99/425 |
| 4,353,347 | 10/1982 | Seed . |
| 4,452,224 | 6/1984 | Misumida . |
| 4,481,408 | 11/1984 | Scheufler . |
| 4,553,524 | * 11/1985 | Wheat .................................. 126/50 |
| 4,889,103 | 12/1989 | Fraioli . |
| 4,957,039 | * 9/1990 | Reyes ................................ 126/25 R |
| 5,072,718 | * 12/1991 | Seal .................................... 126/25 R |
| 5,158,067 | 10/1992 | Dutro et al. . |
| 5,413,087 | 5/1995 | Jean . |

* cited by examiner

Primary Examiner—James C. Yeung
(74) Attorney, Agent, or Firm—Kolisch Hartwell Dickinson McCormack & Heuser

(57) ABSTRACT

A portable outdoor cooker is provided which includes a round, sheet-like heat transfer plate adapted for easy movement between operative and inoperative positions by a single person. The heat transfer plate has an upwardly facing convex cooking surface with a downwardly directed outer rim around the periphery. The convex cooking surface is smooth and continuous and has sufficient slope to cause any juices produced by cooking food to run off the outer rim. A drip pan is disposed under the outer rim to collect the juices.

The portable outdoor cooker also includes a frame assembly with a stand, a suspension device and a shell. The frame assembly is configured to support and position the heat transfer plate, drip pan and burner in relation to one another. The shell includes open top and bottom ends and a sidewall. The sidewall surrounds and deflects wind from the burner. The heat transfer plate rests upon the suspension device and is thereby positioned over the burner in the operative position. The stand is adapted to rest on a support surface, such as the ground, to support the remainder of the cooker in an elevated position.

20 Claims, 6 Drawing Sheets

PORTABLE OUTDOOR COOKER WITH CONVEX COOKING SURFACE

BACKGROUND OF THE INVENTION

The invention relates to a portable cooker for cooking and heating foods. More particularly, the invention is directed to a cooker with a convex cooking surface.

Many types of portable outdoor cookers or stoves are available. The most common variety provides an open grill located over a heat source such as charcoal or gas burners. One problem with this type of outdoor cooker is that the juices from the cooking food fall on the heating elements, causing the flames to flare up and associated uneven heating. This can dry out and sometimes burn the food and can be dangerous.

It is also known to provide a solid griddle surface on a cooker for preparing food. When using a griddle, juice does not drip on the heating element. However, this has limitations of its own. In particular, the food being cooked on a griddle tends to set in its own juice during cooking. In some cases this can result in food that is overly greasy.

One type of cooking surface, known as a Mongolian grill, overcomes some of the limitations of both the open grill and the solid griddle. A Mongolian grill has a solid, slightly convex cooking surface that causes the juice to run off the surface rather than fall onto the heating element. Unfortunately, these cooking surfaces have only been available for use in permanent installations. These expensive iron grills are about 50 inches in diameter and are very large and heavy units which are not portable (i.e., moved from place to place easily by one person). Because of the size, cost and design of these cookers they cannot be used as a portable outdoor cooker.

Accordingly, it is an object of the present invention to provide a portable outdoor cooker with a convex cooking surface.

Another object is to provide an outdoor cooking device that prevents juices and fat from falling on the cooking elements.

Another object is to reduce the flaring up of the flames during cooking when juices fall onto the heating element.

A further object is to provide a cooker with a cooking surface that is easily removed for cleaning and servicing of the burner.

Another object is to provide a cooker that is able to accommodate other cooking surfaces to avoid the need for multiple outdoor cookers.

Another object is to provide a cooker with easily changeable cooking surfaces.

SUMMARY OF THE INVENTION

A portable outdoor cooker is provided which includes a round, sheet-like heat transfer plate adapted for easy movement between operative and inoperative positions by a single person. The heat transfer plate has an upwardly facing convex cooking surface with a downwardly directed outer rim around the periphery. The convex cooking surface is smooth and continuous and has sufficient slope to cause any juices produced by cooking food to run off the outer rim. A drip pan is disposed under the outer rim to collect the juices.

The portable outdoor cooker also includes a frame assembly with a stand, a suspension device and a shell. The frame assembly is configured to support and position the heat transfer plate, drip pan and burner in relation to one another. The shell includes open top and bottom ends, and surrounds and deflects wind from the burner. The heat transfer plate rests upon the shell and is thereby positioned over the burner in the operative position. The stand is adapted to rest on a support surface, such as the ground, to support the remainder of the cooker in an elevated position.

Other objects and features of the present invention will become apparent from the following detailed description considered in connection with the accompanying drawings. The drawings are designed for purposes of illustration only and not as a definition of the limits of invention for which reference should be made to the appended claims.

DETAILED DESCRIPTION

Figure 1:
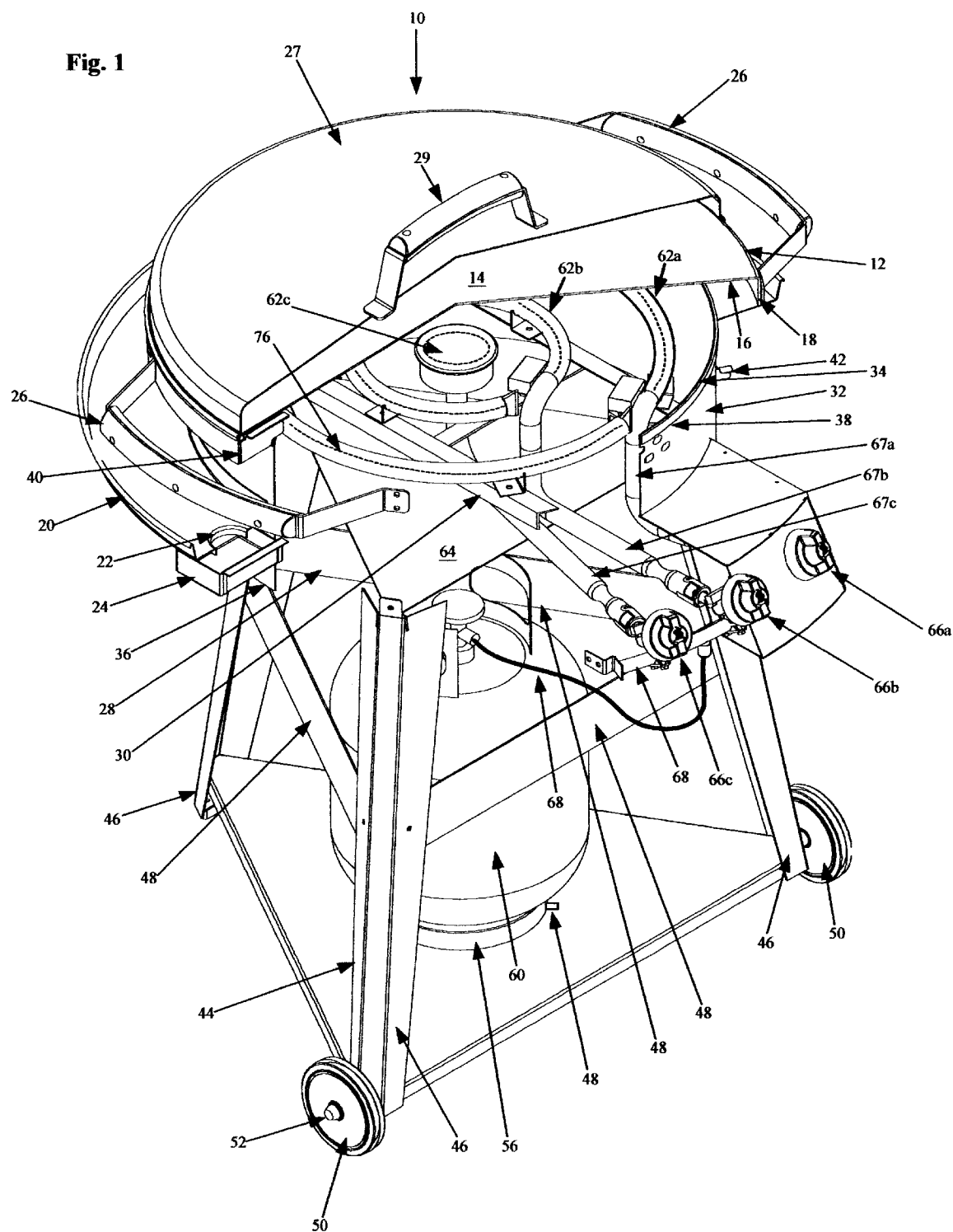
FIG. 1 is a perspective view of a first embodiment of a portable outdoor cooker constructed according to the present invention showing a partially broken-away heat transfer plate in an operative condition and a partially broken away cover.
Figure 2:
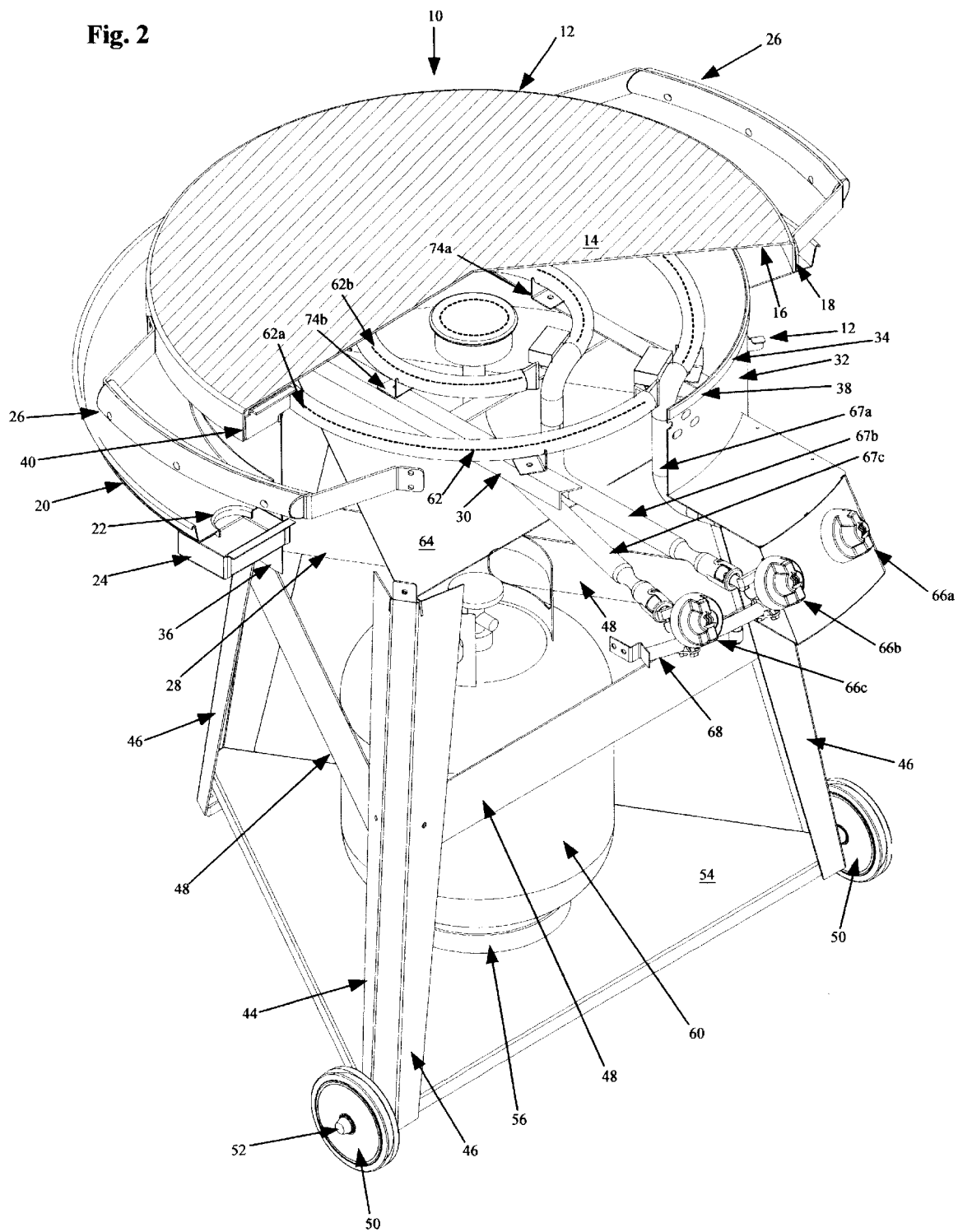
FIG. 2 is a perspective view of the embodiment of FIG. 1 with the cover removed.

A portable outdoor cooker constructed according to the preferred embodiment of the present invention is indicated generally at 10 in FIG. 1. The cooker includes a round, sheet-like heat transfer plate 12 with an upwardly facing convex cooking surface 14, an opposed lower surface 16, and a downwardly dependent outer rim 18 disposed about the perimeter of the surfaces. A drip pan 20 is disposed under the outer rim to collect any juice that may run off the outer rim. Drip pan 20 includes at least one waste hole 22 positioned over a receptacle 24 to collect waste from drip pan 20. Heat transfer plate 12 includes at least one handle 26 to facilitate manual movement of the heat transfer plate between an operative position on the cooker, as shown in FIG. 1, and an inoperative position removed from the cooker, as shown in FIG. 2. A cover 27 may be used to protect the grill surface when the grill is not in use, and to allow the cooking surface to be covered while food is being cooked to trap heat. A handle 29 may be attached to cover 27 to make cover 27 easier to manipulate.

Figure 3:
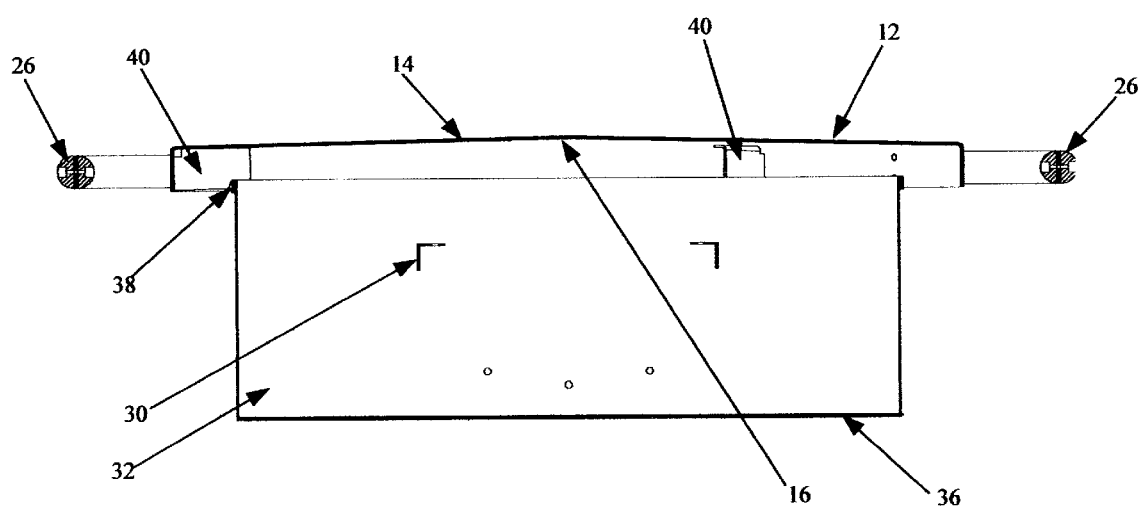
FIG. 3 is a side elevational view of a frame assembly of the embodiment of FIG. 1 showing a heat transfer plate and a shell portion of a frame assembly of the embodiment of FIG. 1.

In the preferred embodiment, the convex cooking surface has a height of convexity between ¼ and ¾ of an inch. The convexity of the cooking surface is illustrated in FIG. 3. The diameter of the convex cooking surface is preferably between 18 and 36 inches in diameter, with 30 inches believed to be an optimal balance of cooking surface area and weight. While larger diameters provide more cooking area, it is believed that a surface larger than 36 inches would be too heavy and require too much heat to be suitable for use in a portable device. In order to minimize weight, a lightweight yet rigid material, such as formed mild steel or stainless steel, is used for constructing the heat transfer plate. It is believed that the heat transfer plate must weigh less than 60 pounds to be manually moveable and more preferably less than 45 pounds.

Cooker 10 also includes a frame assembly 28 that supports various parts of cooker 10. Frame assembly 28 includes burner supports 30, a shell 32 with open top and bottom ends 34 and 36, and a suspension device, such as a support ring 38, mounted along the upper portion of shell 32. Burner supports 30 are disposed within shell 32. Suspension device or support ring 38 is configured to support and position heat transfer plate 12. This can be accomplished in any suitable manner. In the preferred embodiment, as shown in FIG. 3, bottom surface 16 of heat transfer plate 12 includes one or more alignment brackets 40 configured to precisely accept heat transfer plate 12. When heat transfer plate 12 is in the operative position, alignment brackets 40 center heat transfer plate 12 on support ring 38. The size and position of the alignment brackets prevent the heat transfer plate from tipping off support ring 38. Furthermore, the size and position of the alignment brackets are configured to cause a symmetrical discharge of exhaust fumes from burner fuel combustion, thus the heated air and combustion products from the burner are guided through the space beneath bottom surface 16 of heat transfer plate 12 to evenly heat the convex cooking surface.

Shell 32 includes three L-shaped brackets 42 which center and support drip pan 20 so that drip pan 20 is disposed in the proper location just below the downward rim 18 of heat transfer plate 12. The size and position of drip pan 20 serve as a barrier to help prevent bodily approach to the heated cooking surface.

Frame assembly 28 also includes a stand 44 as shown in FIG. 1, which preferably includes three legs 46. In the preferred embodiment, legs 46 are made of formed sheet metal to provide adequate support and stability to heat transfer plate 12. However, legs 46 may also be made of any suitable material that will provide strength to the stand, especially while cooker 10 is being moved. Legs 46 are further strengthened and supported by struts 48. Two wheels 50 are attached to an axle 52 that is joined to the lower ends of two legs 46. Wheels 50 facilitate movement of the cooker from one place to another. A utility rack 54 mounted to the lower portions of legs 46 contains axle 52. Utility rack 54 may include a liquid propane bottle mounting bracket 56 and a liquid propane bottle securing clamp assembly 58. Preferably, liquid propane bottle securing clamp assembly 58 provides thumbscrews that clamp that may hold an American National Standards Institute ANSI certified LP bottle 60.

Figure 4:
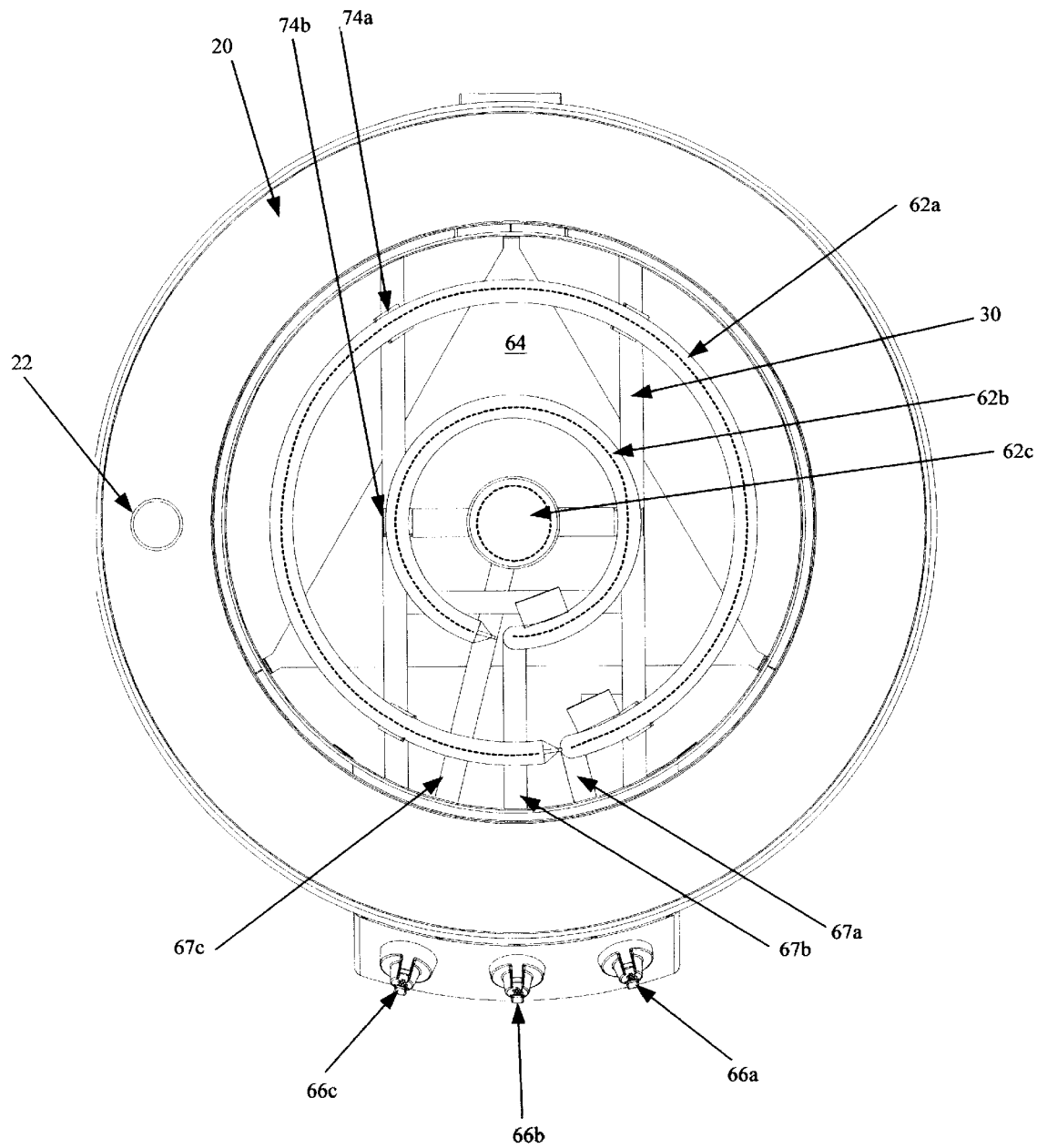
FIG. 4 is a top view of the drip pan, heating elements, valves and deflector of the embodiment of FIG. 1.

The cooker includes one or more burners 62 disposed beneath the heat transfer plate within shell 32, as shown in FIGS. 1–2 and 4. By locating burners 62 within shell 32, the latter is able to act as a wind deflector to prevent disturbance of the burner flames by wind. Burners 62 are also protected from the wind by a deflector 64 mounted within the shell and located just below the burners such that sufficient air flow may still pass through shell 32 for burners 62 to operate properly. Because of the large size of cooking surface 14, a large amount of energy is required to achieve adequate heating. Burners 62 preferably occupies 25–75% of the area under the heat transfer plate in order to supply sufficient heat thereto and is preferably formed from two or more concentric rings, here shown as three rings 62a, 62b, and 62c. Concentric rings 62a–c are beneficial in satisfying the large heat requirement of convex cooking surface 14. As shown in FIG. 1, in the preferred embodiment outer burner 62a is disposed beneath the cooking surface adjacent the perimeter of cooking surface 14, inner burner 62c is disposed beneath the cooking surface adjacent the center of cooking surface 14, and middle burner 62b is disposed between outer burner 62a and inner burner 62b.

In the preferred embodiment, the outermost ring 62a is controlled by a gas valve 66a, the middle ring 62b is controlled by a second gas valve 66b and the inner burner 62c is controlled by valve 62c. Three independent gas valves 66a–c are used to control the amount and distribution of heat supplied to the cooking surface by controlling the flow of gas to burners 62a–c through gas lines 67a–c. This arrangement permits the radial distribution of heat across cooking surface 14 to be controlled in such a manner that the temperature of cooking surface 14 adjacent the perimeter of cooking surface 14 can be made either hotter or cooler relative to the temperature of cooking surface 14 adjacent the center of cooking surface 14. All valves are mounted to a gas manifold 68, which provides a precise gas pressure to each valve as supplied by gas line 70 connected to LP bottle 60. Furthermore, the gas line provides a regulated gas pressure to gas manifold 68. Though gas in burners 62 may be ignited through any desired means, such as by a match, preferably the two valves automatically ignite the gas through the use of an integrated piezoelectric ignition system when the valves are turned on. Alternatively, other types of valves that do not possess this feature may be used. Also, through the use of optional orifices fitted to gas valves 66a and 66b, natural gas may connected to the gas manifold and used to fuel burner 62.

Outer burner 62a is connected to burner supports 30 with burner brackets 74a. Outer burner 62a includes a plurality of apertures 76a aligned along the burner to distribute fuel. Similarly, inner burner 62b is connected to burner supports 30 with burner brackets 74b and also contains a plurality of apertures 76b aligned along the burner to distribute fuel.

Figure 5:
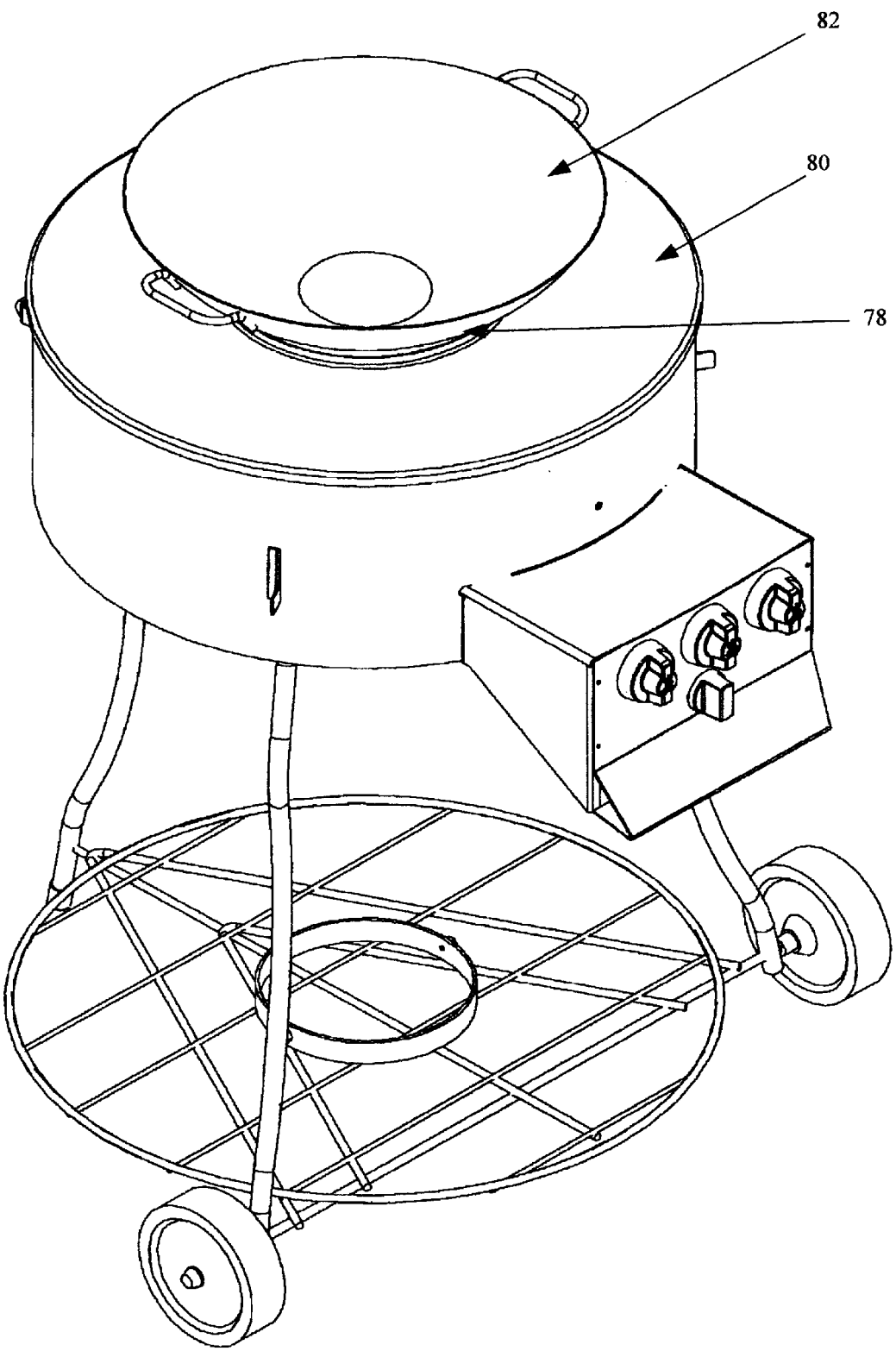
FIG. 5 is a perspective view of a second embodiment of a portable cooker according to the present invention with another cooking surface in the form of a wok.

FIG. 5 depicts another embodiment of the invention in which an adapter plate 78 is provided to fit on top of shell 32. Adapter plate 78, which is installed after removing heat transfer plate 12, has an opening 80 in the center which is suitable to support a wok 82 or another cooking surface. The heat to wok 82 may be controlled with valves 66a–c in the same manner as when heat transfer plate 12 is in use. In addition to wok 82, other adapters and cooking surfaces, such as an open grill, can be supplied to provide other cooking options.

Figure 6:
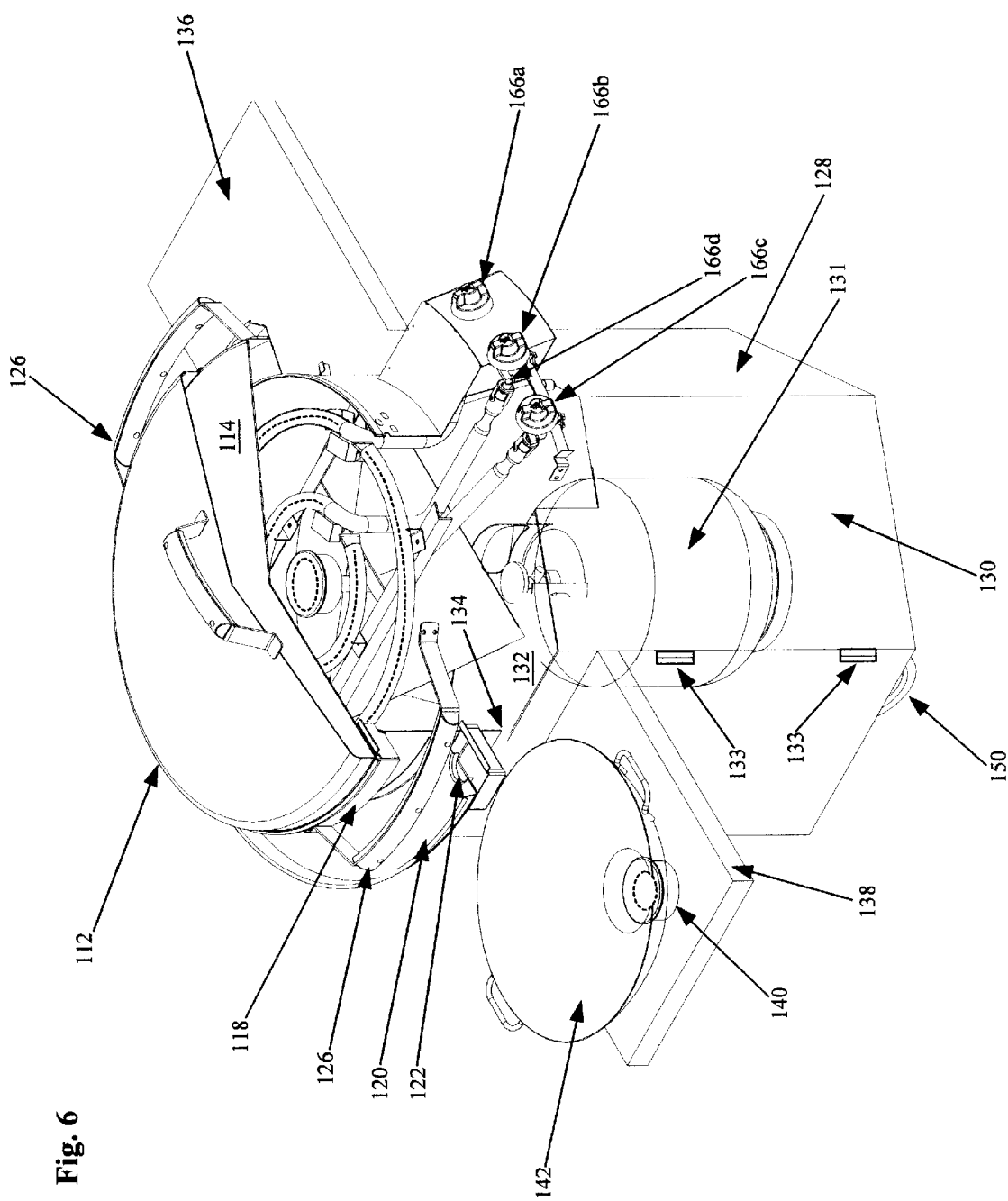
FIG. 6 is a perspective view of a third embodiment of a portable cooker according to the present invention.

A third embodiment of the present invention is shown generally in FIG. 6 at 110. Cooker 110 includes a heat transfer plate 112 with a generally convex cooking surface 114, as described above at 14 for the first embodiment of the invention. Heat transfer plate 112 also includes a rim 118 extending downwardly from the outer perimeter of heat transfer plate 112 and a drip pan 120 positioned below the lower edge of rim 118. Drip pan 120 includes a waste hole 122 that drains into a receptacle. Heat transfer plate 112 also includes at least one handle 126 for removing heat transfer plate 112 from the rest of cooker 110.

Cooker 112 also includes a frame assembly 128. Frame assembly 128 both supports other parts of cooker 110 and protects the burners disposed within frame assembly 128 from wind. Frame assembly 128 includes a plurality of panels 130 joined together at the edges at angles to one another to form a solid enclosure about the burners. In the preferred embodiment, six panels 130 are joined in a hexagonal configuration. A liquid propane bottle 131 may be placed within the enclosure to provide a fuel supply for cooker 110. Also, two panels 130 may be coupled with a hinge 133 to allow one of the panels to be pivotally opened to allow access to the enclosure. Frame assembly 128 also includes a generally planar top surface 132 with an aperture 134 over which heat transfer plate 112 is mounted, and at least one work shelf 136 extending outwardly from one of panels 130. Work shelf 136 provides a general utility surface on which a user may place utensils, cut or prepare, or perform other tasks related to cooking. A second work shelf 138 may also be included on frame assembly 128. Second work shelf may also be configured as a surface on which items may be placed, or it may include a shelf burner 140 configured to heat and support a cooking utensil, such as a wok 142. A gas line may be run through the interior of second shelf 138 to supply gas to shelf burner 140. In addition to valves 166a–c for controlling the burners within frame assembly 128, a fourth valve 166d may be included to control the flow of gas to shelf burner 140.

While features of the invention have been illustrated and described in detail, it will be understood that modifications and variations thereof could be made which do not depart from the spirit of the invention and the scope of the appended claims.

I claim:

1. A portable outdoor cooker for cooking foods comprising:
   a round, sheet-like heat transfer plate adapted for manual movement between operative and inoperative positions, and having an upwardly facing convex cooking surface with a center and a perimeter, an opposed lower surface, and a downwardly dependent outer rim disposed about the perimeter of the surfaces, the convex cooking surface being substantially smooth and continuous and having sufficient slope to cause any juices produced by cooking food to run off the outer rim;
   a drip pan disposed under the outer rim to collect the juices;
   a plurality of burners to distribute flame thereby supplying heat to the heat transfer plate, each of the burners being individually controllable so that the cooking surface adjacent the perimeter can be made either hotter relative to adjacent the center or cooler relative to adjacent the center;
   a frame assembly, including a stand and a shell, the frame assembly being configured to support and position the heat transfer plate, drip pan and burners in relation to one another, the shell having open top and bottom ends, and where the shell surrounds the burners thereby being able to deflect wind therefrom and where the heat transfer plate rests upon the shell and is positioned over the burners in the operative position, and where the stand is adapted to rest on a support surface, such as the ground, to support the remainder of the cooker in an elevated position.

2. The cooker of claim 1, further comprising a plurality of burner support brackets which, when coupled to the shell, supports the burners.

3. The cooker of claim 1, wherein the heat transfer plate is removable and the cooker further includes an alternative cooking surface chosen from the group of ridged, open grill and concave, adapted to replace the heat transfer plate with the convex cooking surface.

4. The cooker of claim 1, wherein the burners include at least two concentric rings.

5. The cooker of claim 1, wherein the stand includes at least three legs which are mounted to the shell, and a wheel assembly which has at least two wheels mounted on the legs whereby the cooker is easily transportable.

6. The cooker of claim 5, wherein the stand is stabilized by a plurality of cross support struts which connect to and brace the legs in a stable position.

7. The cooker of claim 5, wherein the stand includes a utility rack which further braces the legs and joins to the axle.

8. The cooker of claim 1, wherein the maximum height of the convexity of the cooking surface is between ¼ and ¾ of an inch.

9. The cooker of claim 1, wherein the frame assembly includes at least one shelf on which items such as food and utensils may be placed.

10. The cooker of claim 9, wherein the shelf includes a burner on which foods may be cooked separately from foods on the heat transfer plate.

11. The cooker of claim 1, wherein the plurality of burners includes a plurality of concentric burners.

12. The cooker of claim 1, wherein the plurality of burners includes an inner ring disposed beneath the heat transfer plate adjacent the center of the cooking surface, an outer ring disposed beneath the heat transfer plate adjacent the perimeter of the cooking surface, and a middle ring disposed beneath the heat transfer plate between the inner ring and the outer ring.

13. A portable outdoor cooker for cooking foods comprising:
   a round, lightweight, sheet-like heat transfer plate having at least one handle which facilitates manual movement between operative and inoperative positions, an upwardly facing convex cooking surface with a center and a perimeter, an opposed lower surface, and a downwardly dependent outer rim disposed about the perimeter of the surfaces, the convex cooking surface being substantially smooth and continuous and having a diameter between 18 and 36 inches and sufficient slope to cause any juices produced by cooking food to run off the outer rim;
   a drip pan ring disposed under the outer rim to collect any juices;
   a plurality of burners adapted to supply heat to the heat transfer plate, and fueled from a self-contained liquid petroleum source, wherein at least one burner is adapted to supply heat to the heat transfer plate adjacent the center of the cooking surface and at least one burner is located beneath the heat transfer plate adjacent the perimeter of the cooking surface and is adapted to supply heat to the heat transfer plate adjacent the perimeter, and wherein the burners are individually controllable to permit the cooking surface to be made cooler adjacent the center than adjacent the perimeter;
   a frame assembly, including a stand, a drip pan, a suspension device and a shell, the frame assembly being configured to support and position the heat transfer plate, drip pan and burner in relation to one another, the shell having open top and bottom ends, and where the shell surrounds the burner thereby being able to deflect wind therefrom, and where the heat transfer plate rests upon the suspension device and is positioned over the burner in the operative position, and where the stand is adapted to rest on a support surface, such as the ground, to support the remainder of the cooker in an elevated position; and
   wherein the stand includes at least three legs, which are mounted to the shell, cross support struts, which connect to and brace the legs in a stable position, and a wheel assembly, consisting of at least two wheels mounted on two of the legs thereby facilitating easy transportation of the cooker.

14. The cooker of claim 13, wherein the maximum depth of the convexity of the cooking surface is between ¼ and ¾ of an inch.

15. The cooker of claim 12, wherein the plurality of burners are circular and underlie 25–75% of the cooking surface.

16. A portable outdoor cooker for cooking foods comprising:

a round, sheet-like heat transfer plate having a center and having at least one handle which facilitates manual movement by a single person between operative and inoperative positions, an upwardly facing convex cooking surface, an opposed lower surface, and a downwardly dependent outer rim disposed about the periphery of the convex cooking surface being substantially smooth and continuous and having sufficient slope to cause any juices produced by cooking food to run off the outer rim;

a drip pan ring disposed under the outer rim to collect any juices;

a plurality of individually controllable burners adapted to supply heat to the heat transfer plate, wherein the plurality of burners includes an inner burner disposed beneath the heat transfer plate adjacent the center of the heat transfer plate and an outer burner disposed beneath the heat transfer plate adjacent the periphery of the cooking surface;

a frame assembly including a stand, a removable suspension device and a shell with open top and bottom ends, the frame assembly being configured to support and position the heat transfer plate, drip pan and burner in relation to one another, and where the shell surrounds the burner thereby being able to deflect wind therefrom, and wherein the heat transfer plate rests upon the suspension device and is positioned over the burner in the operative position; and an alternative cooking surface chosen from the group of ridged, open grill and concave, being adapted to replace the removable suspension device and heat transfer plate with the convex cooking surface.

17. The cooker of claim 16, wherein the stand is adapted to rest on a support surface, such as the ground, to support the remainder of the cooker in an elevated position and includes at least three legs which are mounted to the shell, cross support struts which connect to and brace the legs in a stable position, a wheel assembly consisting of at least two wheels mounted on an axle that connects with two of the legs, and a utility rack which further braces the legs and joins to the axle.

18. The cooker of claim 16, wherein the convex cooking surface has a diameter between 18 and 36 inches.

19. The cooker of claim 16, wherein the inner burner and the outer burner are concentric.

20. The cooker of claim 16, further comprising a middle burner disposed beneath the heat plate between the inner burner and the outer burner.

* * * * *